June 9, 1931. G. H. BICKERTON 1,808,759
AGRICULTURAL IMPLEMENT
Filed Nov. 9, 1929 2 Sheets-Sheet 1
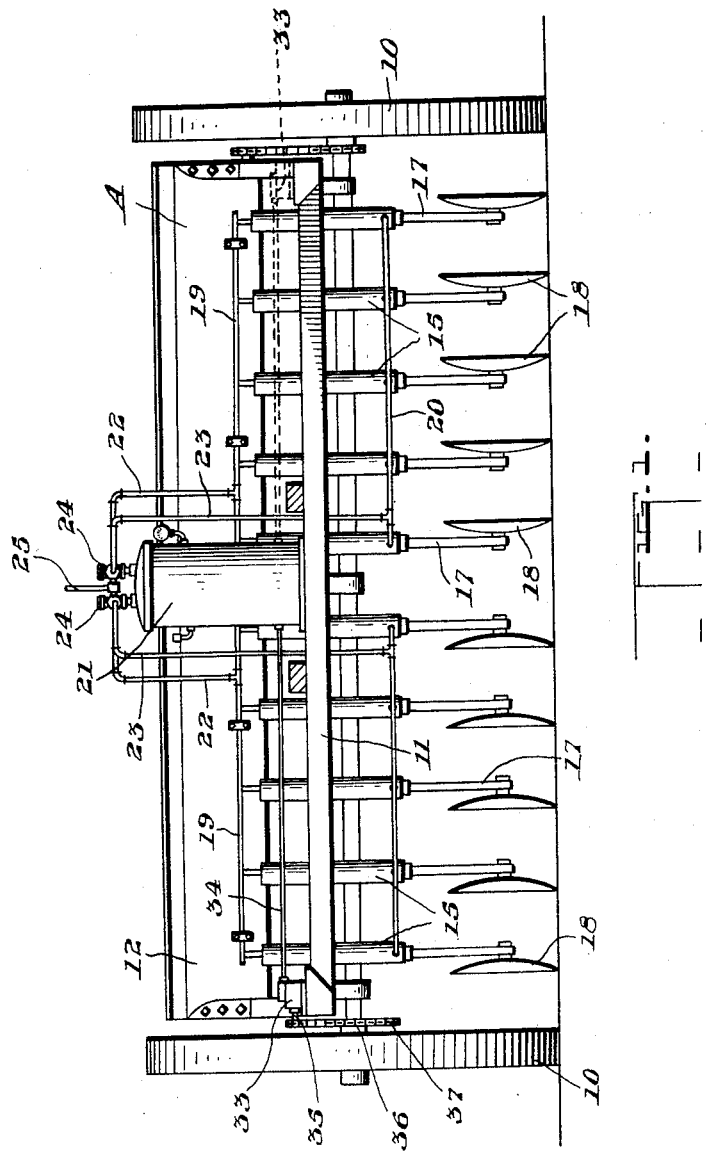
Inventor
George H. Bickerton
By ... Attys.

June 9, 1931. G. H. BICKERTON 1,808,759
AGRICULTURAL IMPLEMENT
Filed Nov. 9, 1929 2 Sheets-Sheet 2
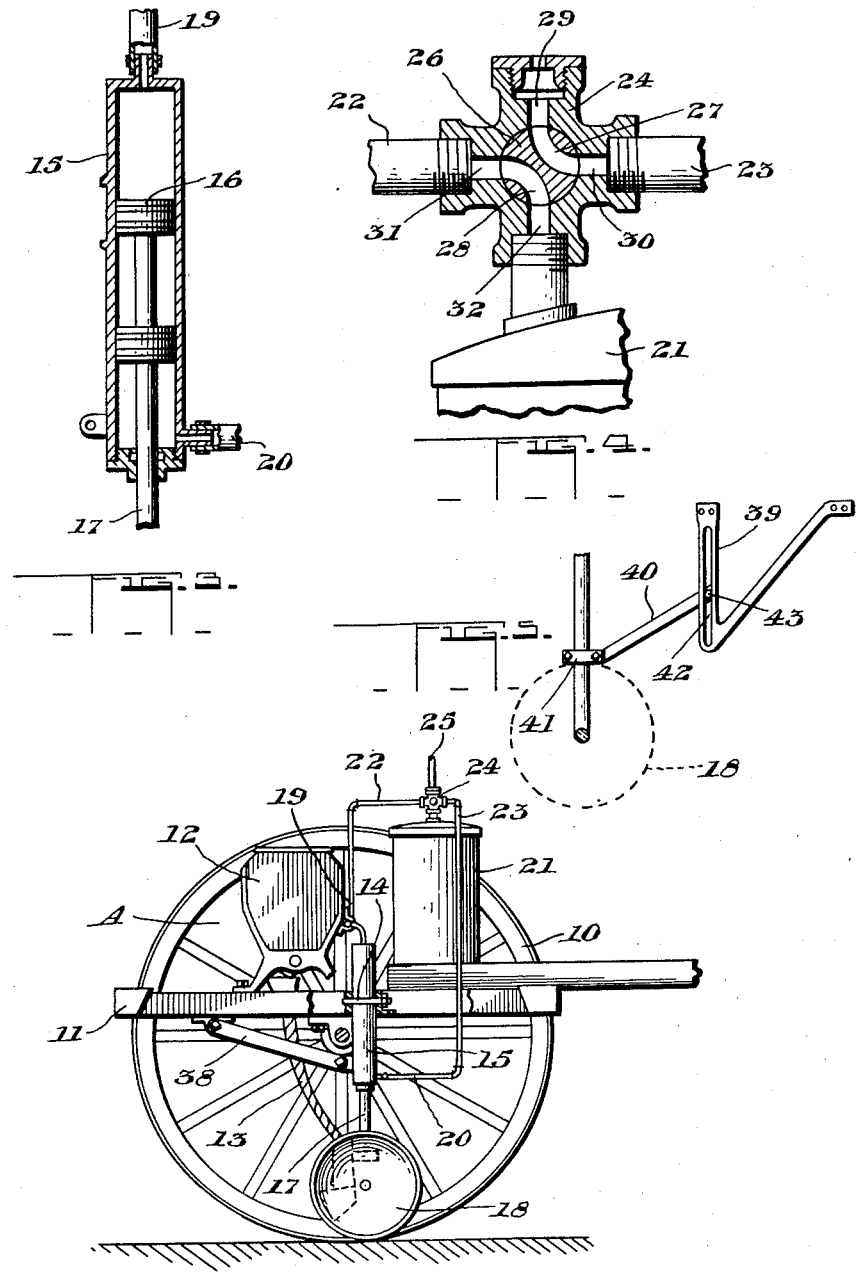
Inventor
George H. Bickerton
BY
Attys.

Patented June 9, 1931

1,808,759

UNITED STATES PATENT OFFICE

GEORGE HERBERT BICKERTON, OF BLUESKY, ALBERTA, CANADA

AGRICULTURAL IMPLEMENT

Application filed November 9, 1929. Serial No. 406,103.

This invention relates to improvements in agricultural implements, more particularly to seed drills, and the objects of the invention are to provide a machine of this character adapted to cut furrows in the ground of uniform depth regardless of the contour of the ground.

A further object of the invention is to provide a series of independently movable cutting members in a device of this character.

A further object is the provision of pneumatic means for effecting upward and downward movement of the cutting members or discs, controlled from the driver's seat.

A further object of the invention is the provision of cutting members which can be controlled under a constant pressure throughout their movement.

With these and other objects in view, the invention consists essentially of a travelling frame work provided with cutting members thereon, a plurality of pistons on the frame work adapted to carry the cutting members, an air tank carried by the frame work connected with the cylinders, and the provision of air pumps for compressing air for the tank, as fully described in the present specification and illustrated in the accompanying drawings which form part of the same.

In the drawings, Figure 1 is a front elevation of the machine in assembly.

Figure 2 is a sectional side elevation of Figure 1.

Figure 3 is a section taken through one of the cylinders disclosing the piston, and connecting air conduits.

Figure 4 is a detail section of the four-way controlling valve, and,

Figure 5 is a detail view of a form of bracing member for the cutting standards.

Referring more particularly to the drawings, A indicates an agricultural implement, here shown as a seeding machine, comprising the usual land wheels 10 mounted on a frame work 11 and carrying the usual seed box 12 and seed conveyor 13. Rigidly mounted throughout the length of the frame work, as for instance by the U-bolts 14, are a plurality of cylinders 15 which extend in vertical relation with respect to the frame and are adapted to house a piston member 16, here shown as a double piston.

The piston rods 17 extend from the pistons through the base of the cylinder and on the lower ends thereof disc cutting members 18 are rotatably mounted adapted to enter into the ground and cut the usual furrows. The pistons are vertically operated backwardly and forwardly by means of compressed air which is supplied to the pistons by means of pipe lines 19 connecting with the top of the cylinders and pipe lines 20 connected with the bottom of the cylinders. These pipe lines are supplied with compressed air from a tank 21 mounted on the frame work which is supplied with the usual gauge and safety valve and connect with the pipe lines 19 and 20 by means of conduits 22 and 23 leading through the valve 24.

The supply of compressed air to the cylinders is controlled by means of the valve structure 24 which is of the four-way type operated through the controlling member or lever 25 which is connected with the valve 26 formed with passageways 27 and 28 adapted to alternately connect the passages 29 and 30, and 31 and 32, the passageways 30 and 31 respectively connecting with the pipe lines 23 and 22 and the passages 29 and 32 connect with the atmosphere and the air tank respectively.

As illustrated by the numeral 33 an air pump is mounted on the frame work and connected by the conduit 34 to the tank 21. This air pump is operated through a rotary shaft 35 carrying a gear and connected through the chain 36 with a sprocket 37 on the driving axle of the frame work so that on forward movement of the machine the pump 33 immediately functions to supply air to the tank 21. If desired, a pair of pumps may be used, one being placed on the opposite side of the machine as illustrated in dotted lines in Figure 1, so that it will readily be seen that the tank 21 is continually and adequately supplied with air, and a constant pressure maintained during operation.

The pistons are each braced from the frame by means of a bracing member 38 connected between the pistons and the frame and, in order to efficiently brace the disc carrying rods or piston rods when they are working at depth in the ground, a brace member may be applied to the rods. One form of bracing member of this character is shown in Figure 5 consisting of a slotted rigid member 39 which is attached to the frame and a brace rod 40 which is strapped to the piston rods by any suitable means such as illustrated at 41 and at the other end engages the rigid member 39 through a slot and pin engagement 42 and 43 so that the brace member allows of movement of the piston rods in a vertical direction but at the same time efficiently braces them against strain while working.

In operation, when the machine is drawn forward, the air pump or pumps 33 immediately function through the driving connection with the axle of the machine and supply air to the air tank 21. The operator, therefore, by means of the controlling lever 25 of valve structure 24 may operate the valve 26 to connect the passages 27 and 28 therein, with the passages 30 and 31 as illustrated in Figure 4, so that compressed air is supplied through the passage 32 to the passage 31 and thence through conduits 22 to the pipe lines 19, thereby introducing compressed air into the top of the cylinders and exerting pressure on the top of the piston so that the cutting members will be forced into contact with the ground and regardless of the contour of the ground will cut a uniform furrow therein due to the even pressure exerted on the piston which will equally force each cutting member into the ground a uniform distance.

At the same time when pressure is introduced to the top of the cylinders to actuate the cutting members into contact with the ground, it will be noted that on movement of the piston downwardly in the cylinder the air in the cylinder below the piston head will be forced out through the opening in the base of the cylinder and through the pipe lines 20 to conduits 23 and passages 30 of the valve 26 and from thence to the atmosphere through the passage 29.

To lift the cutting members from contact with the ground or from the furrows, the control lever 25 is operated to connect the passages 27 and 28 of valve 26 with the passages 30 and 32 and 29 and 31 respectively so that compressed air is then supplied from the tank to the conduits 23 and pipe lines 20, being introduced to the cylinders at the base thereof acting on the lower portion of the cylinder head thereby forcing the piston upwardly and withdrawing the cutting members from engagement with the ground.

At the same time, the air existing in the upper portion of the piston above the piston head is forced out through the opening at the top into the pipe lines 19 and from thence to the passages 31 of the valve and to atmosphere by way of the passage 29.

It will thus be seen that I have provided a device whereby the cutting members can be immediately controlled from the driver's seat to enter into the ground to a uniform depth regardless of the contour of the ground and thereby cut a uniform furrow. At the same time, due to this arrangement, the piston rods carrying the cutting members may be vertically moved to an extent far greater than in movable cutting members in machines hitherto in existence, so that the machine will practically meet all contingencies which arise including quite deep hollows in the contour of the ground.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:—

1. A device of the character described comprising a travelling frame work, a plurality of soil cutting members on said frame work, and pneumatic means for actuating said cutting members to cut furrows in the soil of equal depth.

2. An agricultural implement comprising a travelling framework, a plurality of pistons mounted on the framework, standards in the form of piston rods extending from the pistons, carrying cutting members adapted to contact with the ground, and pneumatic means in connection with the pistons controlled from the driver's seat for raising and lowering said cutting members into and from contact with the ground.

3. An agricultural implement comprising a travelling framework, a plurality of cutting members carried by the framework, pneumatic means for forcing said cutting members into the ground to a uniform depth and for withdrawing said cutting members from contact with the ground.

4. An agricultural implement comprising a movable frame, a plurality of pistons mounted on said frame, a plurality of standards in the form of pistons extending from said cylinder, cutting members mounted on said standards and adapted to contact with the ground, an air tank on the framework, conduits connected with the tank and with the pistons, control member adjacent the driver's seat for controlling the air supplied to the pistons, and means on the framework for constantly supplying air to the tank during the movement of the framework.

5. An agricultural implement comprising a movable framework, a plurality of pistons mounted on the framework in vertical relation, standards in the form of piston rods extending from the cylinders, soil cutting members mounted on the standards adapted to contact with the ground, an air tank on the framework, conduits connecting the air tank for supplying air to the top or base of the cylinders for forcing said cutting members to a uniform depth into the ground or raising said members from contact with the ground and means for constantly supplying the tank with compressed air on forward movement of the framework.

6. An agricultural implement comprising a movable framework, a plurality of pistons rigidly mounted on the framework, a plurality of standard members in the form of piston rods extending from the cylinders and carrying a plurality of soil cutting members, means for supplying compressed air to the top or base of the cylinders for forcing the cutting members into the ground or raising them from contact with the ground, means for maintaining a constant compressed air supply and means for automatically expelling the air from the top or base of the cylinders according to the movement of the pistons.

7. In an agricultural implement including a movable framework having cylinders mounted thereon and a plurality of pistons operatively associated with the cylinders carrying cutting members, means for supplying compressed air to the cylinders for raising and lowering the cutting members to and from contact with the ground, and a controlling member in the form of a four-way valve for controlling the supply of air to the cylinders and discharging surplus air therefrom.

8. A device of the character described, comprising a travelling frame work, a plurality of cutting members carried by the framework, pneumatic means for forcing said cutting members into the ground to a uniform depth and for withdrawing said cutting members from contact with the ground and a control member adjacent the driver's seat for controlling both the downward and upward movement to and from the ground of said cutting members.

9. An agricultural implement comprising a movable frame work, a plurality of pistons rigidly mounted on the frame work, a plurality of standard members in the form of piston rods carrying piston members extending from the cylinders and carrying a plurality of soil cutting members, means for supplying compressed air to the top or base of the cylinders acting on the piston members for forcing the cutting members into the ground or raising them from contact with the ground, means for maintaining a constant compressed air supply and a four-way valve for controlling the supply of compressed air to the cylinders and for releasing contained air in the cylinders according to the movement of the pistons.

In witness whereof I have hereunto set my hand.

GEORGE HERBERT BICKERTON.